United States Patent
Niiori et al.

(10) Patent No.: US 6,309,428 B1
(45) Date of Patent: Oct. 30, 2001

(54) METHOD FOR PRODUCING ELECTROCHEMICAL CAPACITOR

(75) Inventors: Yusuke Niiori, Inuyama; Hiroyuki Katsukawa, Aichi-prefecture; Hitoshi Yoshida, Okazaki, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/555,979

(22) PCT Filed: Nov. 19, 1999

(86) PCT No.: PCT/JP99/06494

§ 371 Date: Jun. 6, 2000

§ 102(e) Date: Jun. 6, 2000

(87) PCT Pub. No.: WO00/31764

PCT Pub. Date: Jun. 2, 2000

(30) Foreign Application Priority Data

Nov. 25, 1998 (JP) .................................................. 10-334295
Oct. 15, 1999 (JP) .................................................. 11-293633

(51) Int. Cl.[7] .................................. H01G 9/00; H01G 9/02
(52) U.S. Cl. .................... 29/25.03; 361/502; 361/512; 361/523; 361/535; 361/536
(58) Field of Search .................... 29/25.01–25.03; 361/500–505, 522–525, 535–537, 512

(56) References Cited

FOREIGN PATENT DOCUMENTS

| 0385711-A | * | 4/1991 | (JP) . |
| 07022295 A | | 1/1995 | (JP) . |
| 07201674 A | | 8/1995 | (JP) . |
| 10041199 A | | 2/1998 | (JP) . |
| 10106524 A | | 4/1998 | (JP) . |
| 10242009 A | | 9/1998 | (JP) . |
| 11121305 A | | 4/1999 | (JP) . |
| 2000331888-A | * | 11/2000 | (JP) . |

* cited by examiner

Primary Examiner—John F. Niebling
Assistant Examiner—Ha Tran Nguyen
(74) Attorney, Agent, or Firm—Burr & Brown

(57) ABSTRACT

A process for producing an electrochemical capacitor including an organic electrolytic solution and electrode bodies immersed in the organic electrolytic solution, each comprising a polarizing electrode (composed mainly of a carbon material containing a partially oxidized, graphite-like microcrystalline carbon), a separator and a collector, in which capacitor each polarizing electrode gives rise to volume expansion when charged and volume contraction when discharged, is provided. The process includes: a step of placing each electrode body and the organic electrolytic solution in a cell container to form a unit cell, a step of placing the unit cell or a cell integrate obtained by electrically connecting a plurality of such unit cells, in a first capacitor container to constitute a first electrochemical capacitor, a step of subjecting the first electrochemical capacitor to charging-discharging cycles until the maximum value of the stress caused by the volume expansion of each polarizing electrode during charging becomes almost constant, and a step of transferring, after the maximum value of the stress has become almost constant, the unit cell or the cell integrate into a second capacitor container to constitute a second electrochemical capacitor. The process can provide an electrochemical capacitor which causes no plastic deformation of the capacitor container and which is superior in durability and reliability.

2 Claims, 5 Drawing Sheets

US 6,309,428 B1

METHOD FOR PRODUCING ELECTROCHEMICAL CAPACITOR

TECHNICAL FIELD

The present invention relates to a process for producing an electrochemical capacitor.

BACKGROUND ART

As a conventional electric double layer capacitor comprising an organic electrolytic solution and polarizing electrodes immersed in the solution, there is known an electric double layer capacitor which uses, as the main component of the polarizing electrodes, an active carbon having, on the surface, fine pores formed by a treatment called activation and having a specific surface area of 1,000 m$^2$/g or more. In such an electric double layer capacitor, the solute ion dissolved in the organic electrolytic solution is adsorbed inside the fine pores, whereby an electrostatic capacity is exhibited.

In such an electric double layer capacitor having the above constitution, the electrostatic capacity and the dielectric strength are dependent upon the activation method of the active carbon. An electric double layer capacitor using an active carbon subjected to a stream activation method, for example, has an electrostatic capacity of 15 F/cc and a dielectric strength of 3 V; and an electric double layer capacitor using an active carbon subjected to an alkali activation method has an electrostatic capacity of 20 F/cc and a dielectric strength of 2.5 V.

In recent years, higher electrostatic capacity and higher dielectric strength have been desired for electric double layer capacitors and a capacitor having an electrostatic capacity of 30 F/cc or more and a dielectric strength of 3.5 V or more have been sought. However, an electric double layer capacitor using an active carbon, and having such properties has not yet been developed and no process for producing a capacitor having such properties has been reported.

In order to solve the above-mentioned problems, the present invention has been made with an aim of providing a process for producing an electrochemical capacitor which can show an electrostatic capacity and a dielectric strength both higher than those of electric double layer capacitors using an active carbon, by using, as the main component of the polarizing electrodes, a carbon material containing a graphite-like microcrystalline carbon.

SUMMARY OF THE INVENTION

According to the present invention, there is provided a process for producing an electrochemical capacitor comprising an organic electrolytic solution and electrode bodies immersed in the organic electrolytic solution, each comprising a polarizing electrode (composed mainly of a carbon material containing a partially oxidized, graphite-like microcrystalline carbon), a separator and a collector, in which capacitor each polarizing electrode gives rise to volume expansion when charged and volume contraction when discharged, which process comprises:

a step of placing each electrode body and the organic electrolytic solution in a cell container to form a unit cell, a step of placing the unit cell or a cell integrate obtained by electrically connecting a plurality of such unit cells, in a first capacitor container to constitute a first electrochemical capacitor, a step of subjecting the first electrochemical capacitor to charging-discharging cycles until the maximum value of the stress caused by the volume expansion of each polarizing electrode during charging becomes almost constant, and a step of transferring, after the maximum value of the stress has become almost constant, the unit cell or the cell integrate into a second capacitor container to constitute a second electrochemical capacitor.

The first capacitor container preferably has a pressure-releasing valve.

DETAILED DESCRIPTION OF THE INVENTION

First, description is made on an electric double layer capacitor of the prior art, which uses active carbon as the main component of the polarizing electrodes (the capacitor is hereinafter referred to as conventional capacitor) with reference to FIGS. 3 and 4.

Figure 3:
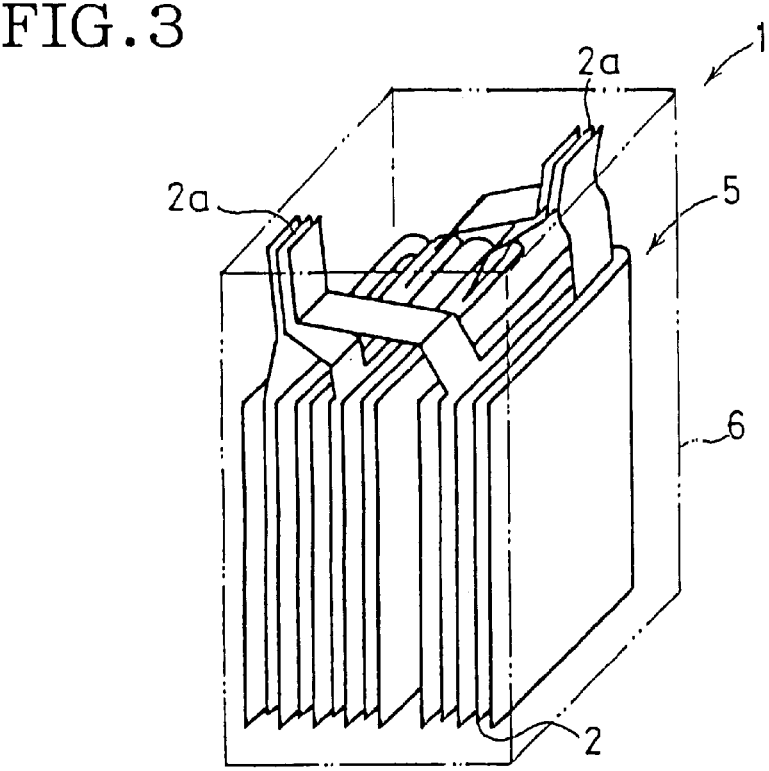
FIG. 3 is a drawing showing an example of the constitution of the unit cell of conventional electrochemical capacitor.

As shown in FIG. 3, the unit cell 1 of the conventional capacitor comprises a cell container 6 made of aluminum and a laminate 5 placed in the cell container 6, wherein the laminate 5 is formed by alternately laminating a plurality of positive electrode bodies 2 and a plurality of negative electrode bodies 2 (these electrode bodies are explained later) and then bundling the ears 2a of the former electrode bodies and the ears 2a of the latter electrode bodies into one piece, respectively.

In the cell container 6 is also placed an organic electrolytic solution (not shown) obtained by dissolving a solute such as Et$_4$NBF$_4$ (ET$_4$N: tetraethylammonium), Et$_4$NPF$_6$, BU$_4$NBF$_4$ (BU$_4$N: tetrabutylammonium), Bu$_4$NPF$_6$ or the like in a give concentration (e.g. about 1 mole/liter), in ethylene carbonate, propylene carbonate, γ-butyrolactone, sulfolane or the like; and the laminate 5 is immersed in the organic electrolytic solution. Each of the bundled ears 2a and 2a is electrically connected to a positive electrode terminal (not shown) or a negative electrode terminal (not shown) each fitted to the top of the cell container 6, whereby the unit cell 1 is constituted. The electrode bodies 2 connected to the positive electrode terminal function as a positive electrode and the electrode bodies 2 connected to the negative electrode terminal function as a negative electrode.

Each electrode body 2 is constituted by interposing a collector having an ear 2a, between sheet-shaped polarizing electrodes and interposing the resulting material between separators. As the collector, there can be used, for example, an aluminum foil of particular shape; as each separator, there can be used, for example, a cellulose-made mixed paper of particular shape. Each polarizing electrode can be obtained by kneading an active carbon, a binder (e.g. polytetrafluoroethylene) and a conductivity-improving agent (e.g. carbon black) and rolling the kneaded material.

Incidentally, each electrode body may also be obtained by mixing an active carbon, a binder and a conductivity-improving agent with a solvent, coating the resulting paste on a collector, drying the coated collector to evaporate and remove the solvent, and interposing the resulting material between separators. As the method for coating of the paste, there can be mentioned known coating methods such as spray coating, brush coating, screen printing and the like.

Figure 4:
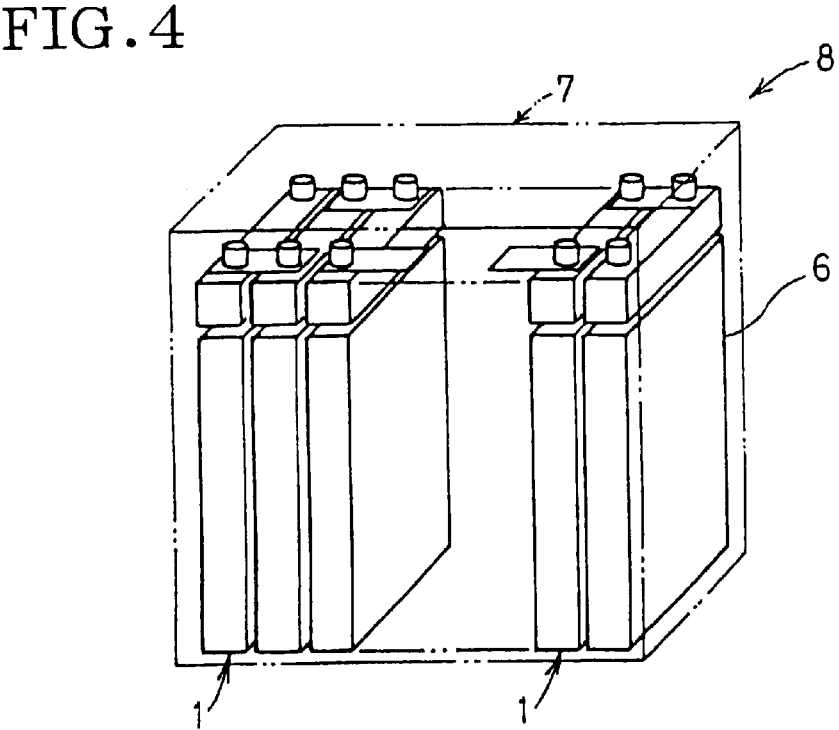
FIG. 4 is a drawing showing an example of the constitution of conventional electrochemical capacitor.

As shown in FIG. 4, a plurality of such unit cells 1 are electrically connected in series to constitute a cell integrate and this cell integrate is placed in a capacitor container 7, whereby a conventional capacitor 8 is constituted.

In contrast to this conventional capacitor 8, there is proposed, by the present invention, an electrochemical capacitor using polarizing electrodes composed mainly of a carbon material containing a partially oxidized, graphite-like microcrystalline carbon. In this electrochemical capacitor, it is considered that an ion is adsorbed by the product generated by an electrochemical reaction during the first charging, which gives rise to an electrostatic capacity. The electrochemical capacitor shows an electrostatic capacity of 30 F/cc and a dielectric strength of 3.5 V, both of which are superior to those of conventional capacitor 8.

Figure 5A:
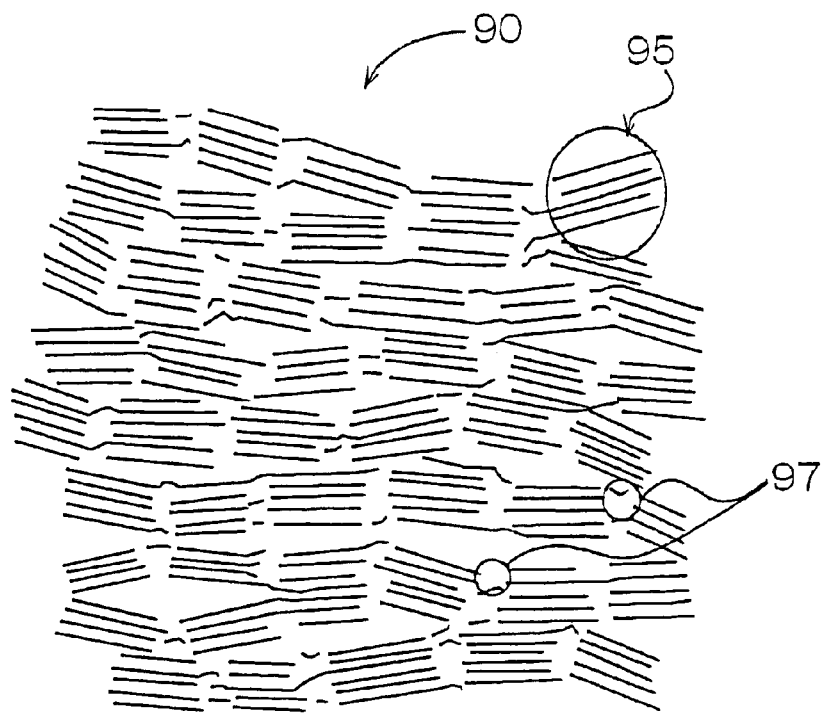
FIGS. 5(a) and 5(b) are drawings each showing the structure of a carbon material preferably used in the present invention.
Figure 5B:
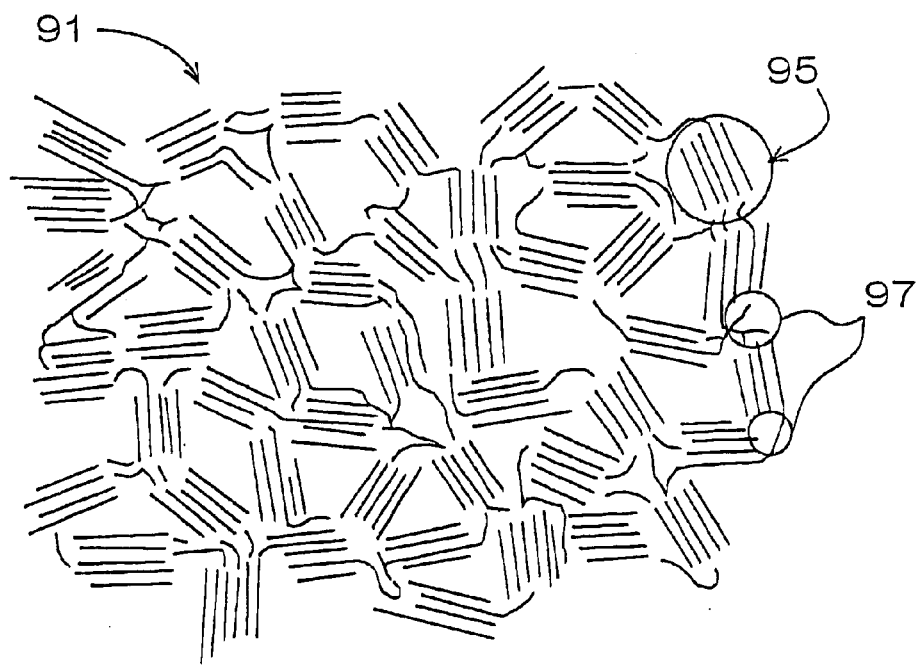

Here, description is made of "a carbon material containing a partially oxidized, graphite-like microcrystalline carbon". Organic materials, when carbonized at 1,000° C. or lower, generally become an irregular layer structure carbon 90 or 91 having imperfect 6-membered ring networks, such as shown in FIGS. 5(a) or 5(b). The graphite-like microcrystalline carbon refers to the microcrystalline carbon 95 consisting of regularly piled layers of 0.1 nm to several tens of nm in thickness, present in the irregular layer structure carbon 90 or 91.

When the irregular layer structure carbon 90 or 91 is oxidized in, for example, air, first the moieties 97 of low crystal regularity are oxidized and vaporize in the form of carbon monoxide or carbon dioxide. In further progress of the oxidation, the edge of the microcrystalline carbon 95 and the imperfect part of the 6-membered ring structure are oxidized; finally, all the carbon is oxidized and becomes a gas.

Figure 6:
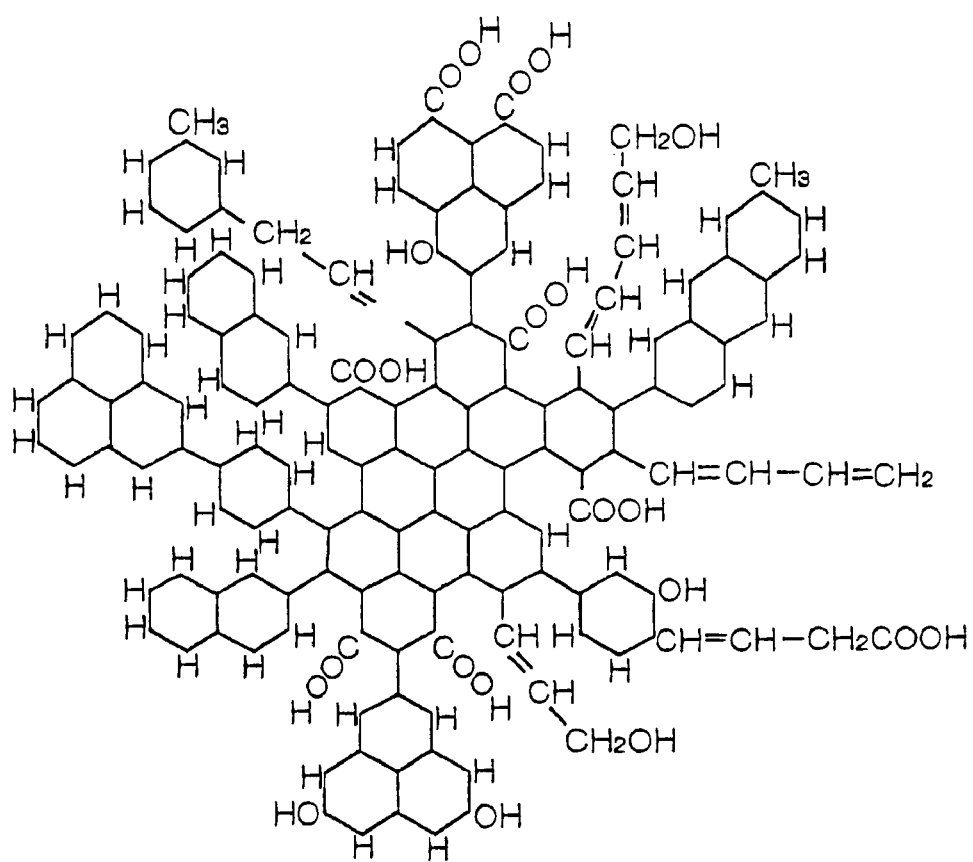
FIG. 6 is a drawing schematically showing the molecular structure of a carbon material preferably used in the present invention.

However, by controlling the oxidation conditions, the oxidation can be made partial oxidation will occur, whereby "a carbon material containing a partially oxidized, graphite-like microcrystalline carbon" can be obtained. In this carbon material, as shown in FIG. 6, acidic functional groups are mainly bonded to the edges or imperfect structural parts of the microcrystalline 6-membered ring network. For such partial oxidation, there can be preferably used, for example, a thermal treatment using an oxidizing gas (e.g. air or oxygen) and a chemical oxidation using hot nitric acid or the like. Incidentally, FIG. 6 schematically shows one form of the molecular structure of carbon material and, naturally, the carbon material according to the present invention is not restricted to a carbon material having the structure of FIG. 6.

When an external voltage is applied to such an electrochemical capacitor to conduct charging, the polarizing electrodes expand mainly in the direction of the electric field. This expansion is considered to be due to the expansion of a reaction product which is generated by an electrochemical reaction during the charging, and the volume of the polarizing electrodes after expansion becomes 2 times or more the original volume in some cases. Such expansion of polarizing electrodes during charging results in expansion of the electrode body and accordingly its laminate. Consequently, a stress appears and the capacitor container is pressed.

When the electrochemical capacitor of the present invention is constituted in the same manner as in conventional capacitor, there have been inconveniences such as plastic deformation of the capacitor container and the like, for the reason mentioned above.

In order to avoid the plastic deformation of the capacitor container, it is considered to allow the cell container or capacitor container to be made of, for example, a stainless steel of high rigidity and large thickness. This, however, incurs a problem in that the resulting electrochemical capacitor is large and heavy.

Hence, the present inventors made an extensive study on a means to avoid plastic deformation of the capacitor container, caused by the stress generated by the expansion of polarizing electrodes; as a result, the present invention was completed. That is, a once produced electrochemical capacitor was subjected to charging-discharging cycles until the maximum value of the stress generated during charging (hereinafter, referred to as "maximum stress") became almost constant; then, the unit cell or cell integrate contained in the capacitor container was transferred into a separate capacitor container; thus, a new electrochemical capacitor was produced.

Modes for carrying out the present invention are described below with reference to the accompanying drawing=s.

First, an electrode body is produced. The electrode body is obtained by interposing a collector made of, for example, an aluminum foil and having an ear, between sheet-shaped polarizing electrodes and then interposing the resulting material between separators made of cellulose-based mixing paper or the like. Incidentally, the polarizing electrodes can be obtained by kneading the above-mentioned carbon material, a binder (e.g. polytetrafluoroethylene) and a conductivity-improving agent (e.g. carbon black) and rolling the kneaded material.

The electrode body can also be obtained by mixing the above-mentioned carbon material, a binder, a conductivity-improving agent and a solvent, coating the resulting paste on a collector, drying the coated collector to evaporate and remove the solvent component, and interposing the resulting material between separators.

A plurality of the thus-produced electrode bodies are made into an electrode body laminate wherein electrode bodies each functioning as a positive electrode and electrode bodies each functioning as a negative electrode are laminated alternately and the ears of the positive electrodes and the ears of the negative electrodes are bundled into one piece, respectively.

Next, the electrode body laminate and an organic electrolytic solution obtained by dissolving a solute such as $Et_4NBF_4$, $Et_4NPF_6$, $Bu_4NBF_4$, $Bu_4NPF_6$ or the like in a concentration of, for example, 1 mole/liter, in ethylene carbonate, propylene carbonate, γ-butyrolactone, sulfolane or the like, are placed in a cell container.

Each bundle of ears is electrically connected to a positive electrode terminal or a negative electrode terminal, both fitted to the top of the cell container, whereby a unit cell 10 is constituted. That is, this unit cell 10 has the same constitution as the unit cell 1 of conventional capacitor 8 except that the polarizing electrode is composed mainly of the above-mentioned carbon material.

Next, a plurality of such unit cells 10 are electrically connected in series, whereby a cell integrate is produced.

Figure 1:
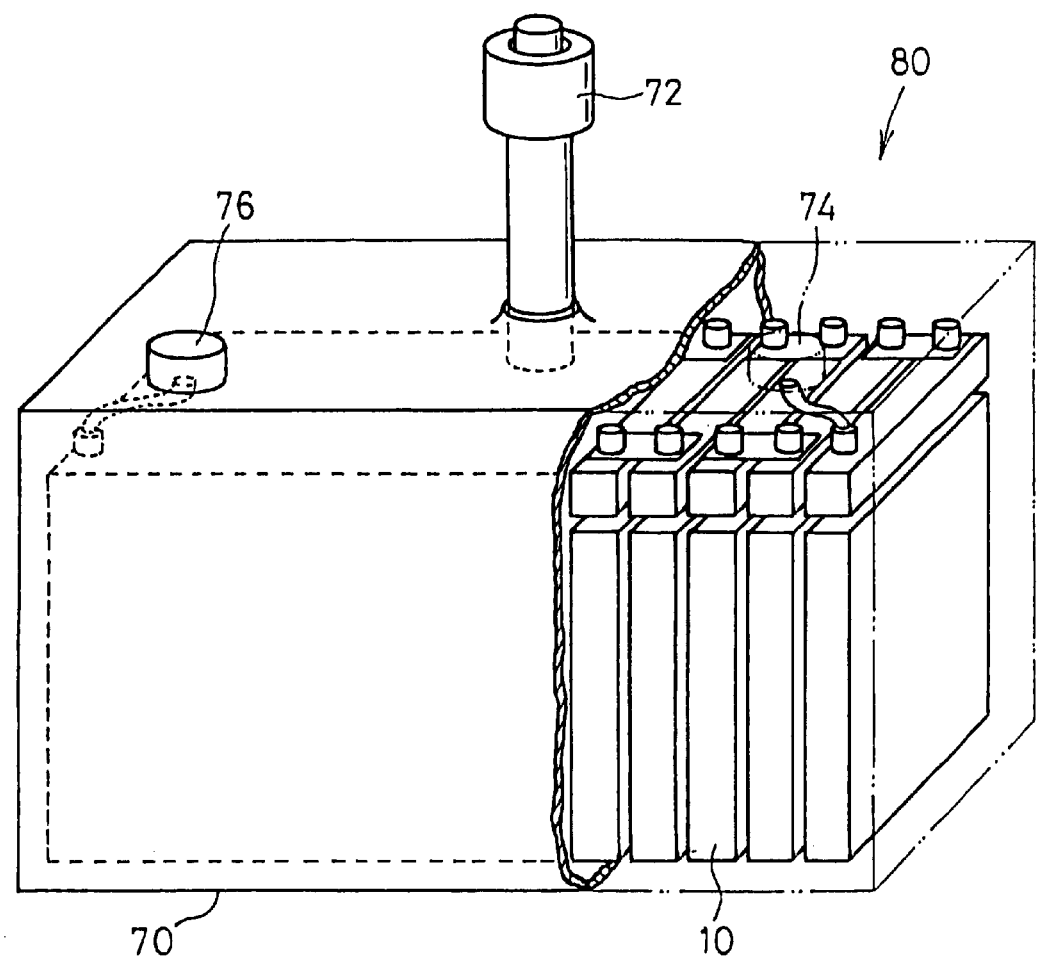
FIG. 1 is a drawing showing an example of the first electrochemical capacitor produced in one step of the present process for producing an electrochemical capacitor.

Next, as shown in FIG. 1, the cell integrate is placed in a capacitor container (i.e. a first capacitor container) 70; for example, the positive electrode terminal of the right end unit cell 10 is connected to a positive electrode terminal 74 provided in the lid of the capacitor container 70 and the negative electrode terminal of the left end unit cell (not shown) is connected to a negative electrode terminal 76 provided in the lid, whereby a first electrochemical capacitor 80 is constituted. In the lid is also provided a pressure-releasing valve 72 (to be described later), and the lid and the body of the capacitor container are tightened by a bolt (not shown).

The first capacitor container 70 is made of a material which shows no plastic deformation against the stress generated during charging, for example, a thick stainless steel sheet.

Next, the first electrochemical capacitor 80 is subjected to charging-discharging cycles. A gas is generated from the polarizing electrodes during the initial charging of the charging-discharging cycles. Therefore, the first capacitor container 70 preferably has a mechanism capable of appropriately releasing the gas outside. As the mechanism of releasing the gas outside, there can be mentioned, for example, a pressure-releasing valve 72 as shown in FIG. 1. Here, the pressure-releasing valve refers to a valve which opens automatically when the pressure inside the first capacitor container exceeds a particular level, and releases a gas or liquid contained in the container and, when the pressure inside the container decreases below the particular level owing to the release, shuts automatically.

That is, the pressure-releasing valve 72 opens when a gas is accumulated and the pressure inside the first capacitor container 70 exceeds the particular level and, the gas is released outside of the first capacitor container 70. When the pressure decreases below the particular level, the pressure-releasing valve 72 shuts.

The amount of the gas generated decreases with the progress of charging-discharging cycles and finally becomes zero (no gas generation). The reason for gas generation is not made clear at the present stage but is presumed to be as follows. A gas is generated during the production of carbon material and is occluded by the carbon material, and this occluded gas is released gradually during charging; or, the carbon material gives rise to an electrochemical reaction during charging to generate a gas.

As mentioned previously, each polarizing electrode (carbon material) expands during charging, whereby a stress is generated. The maximum stress is the largest at the first cycle, decreases with the progress of charging-discharging cycles, and finally becomes almost constant.

The stress decreases gradually with discharging; however, it partially remains even after the completion of discharging. The value of the stress at the completion of discharging (hereinafter referred to as "residual stress") increases with the progress of charging-discharging cycles; however, it saturates as the maximum stress becomes almost constant, and becomes almost constant as well. At this timing, there is no gas generation from each polarizing electrode.

The first capacitor container 70 is highly rigid and, as mentioned previously, exhibits no plastic deformation even when the maximum stress is the largest. Therefore, during charging-discharging cycles, the cell integrate is pressed by the first capacitor container 70, dependent upon the level of the stress generated. In other words, for example, the cell integrate at the completion of final discharging is pressed by the first capacitor container 70, dependent upon the residual stress at that time.

Next, the first electrochemical capacitor 80 is disassembled. That is, the lid is separated from the main body to take out the cell integrate.

At this time, the cell integrate is liberated from the pressure by the capacitor container 70. This liberation reduces the residual stress to zero.

Next, a capacitor container separate from the first capacitor container 70, i.e. a second capacitor container is prepared. The cell integrate is transferred into the second capacitor container, whereby a second electrochemical capacitor is constituted.

As the second capacitor container, there is selected a container having such rigidity that the container shows no plastic deformation against the maximum stress which has become almost constant.

Specifically, since the maximum stress in the second electrochemical capacitor is equal to the difference, in the first electrochemical capacitor 80, between the maximum stress (which has become constant) and the residual stress (which has become constant), the thickness and material of the second capacitor container are determined so that the second capacitor container shows no plastic deformation against a stress equal to the above difference. This is because, in the second electrochemical capacitor, the cell integrate is released from any pressure and its residual stress is zero, as mentioned above. As the preferred material of the second capacitor container, there can be mentioned stainless steel, aluminum, etc.

In the second electrochemical capacitor, there is no gas generation from each polarizing electrode; therefore, the second capacitor container need not have any pressure-releasing valve. Hence, the second electrochemical capacitor can be smaller and lighter than the first electrochemical capacitor 80.

When the second electrochemical capacitor is subjected to charging-discharging cycles, the maximum stress is already constant and the second capacitor container shows no plastic deformation against the maximum stress. Therefore, by using the second electrochemical capacitor as a final product, there can be provided a small-sized, lightweight electrochemical capacitor which shows no plastic deformation of capacitor container even when a stress has been generated during charging.

When it is desired to compress the cell integrate by each capacitor container in order to reduce the contact resistance between the polarizing electrode and collector, the volume of each capacitor container is made slightly smaller than the volume of the cell integrate. In this case, each capacitor container is designed so that the container shows no plastic deformation against the total stress which the container receives, that is, the sum of the maximum stress and the stress generated by the reaction of the cell integrate.

In the above mode for carrying out the present invention, a plurality of unit cells 10 are connected in series to form a cell integrate, and the cell integrate is placed in the first capacitor container and then in the second capacitor container. The same effects are obtained even when the unit cell 10 per se is placed in the first capacitor container and then in the second capacitor container.

In the above mode, all the walls of the first capacitor container are constituted by stainless steel or the like. However, at least the container walls in the expansion direction of polarizing electrodes (two parallel walls) may be constituted by, for example, a thin film made of a polymer material (e.g. polyethylene or polyvinyl chloride). In this case, the two walls made of a thin film may be fixed by a jig for prevention of container deformation.

In the first electrochemical capacitor 80 or the second electrochemical capacitor, the organic electrolytic solution may be impregnated into each polarizing electrode and each separator placed between the positive electrode and negative electrode. Such a capacitor shows the same capacity and dielectric strength as the capacitor wherein an electrode body laminate is immersed completely in an organic electrolytic solution. In the present invention, such a state that an organic electrolytic solution is impregnated into each polarizing electrode and each separator, is included in a state that each polarizing electrode is immersed in an organic electrolytic solution.

EXAMPLE

First, a unit cell 10 was assembled. A plurality of such unit cells 10 were electrically connected in series to form a cell integrate. In order to reduce, in the cell integrate, the contact resistance between each polarizing electrode (made mainly of a carbon material containing a graphite-like microcrystalline carbon) and each collector made of an aluminum foil, the cell integrate was pressed from the horizontal direction of FIG. 1 at a pressure of 2.0 kgf/cm$^2$ (196 kPa), to increase the adhesivity of the electrode body laminate in each cell unit 10.

Next, the cell integrate was placed in a first capacitor container 70 made of stainless steel, to assemble a first electrochemical capacitor 80 shown in FIG. 1. To the lid of the first capacitor container 70 was beforehand fitted a pressure-releasing valve 72 by welding. Incidentally, the volume of the first capacitor container 70 is such that it can accommodate the cell integrate which is in a state compressed at a pressure of 2.0 kgf/cm$^2$ (196 kPa).

Figure 2:
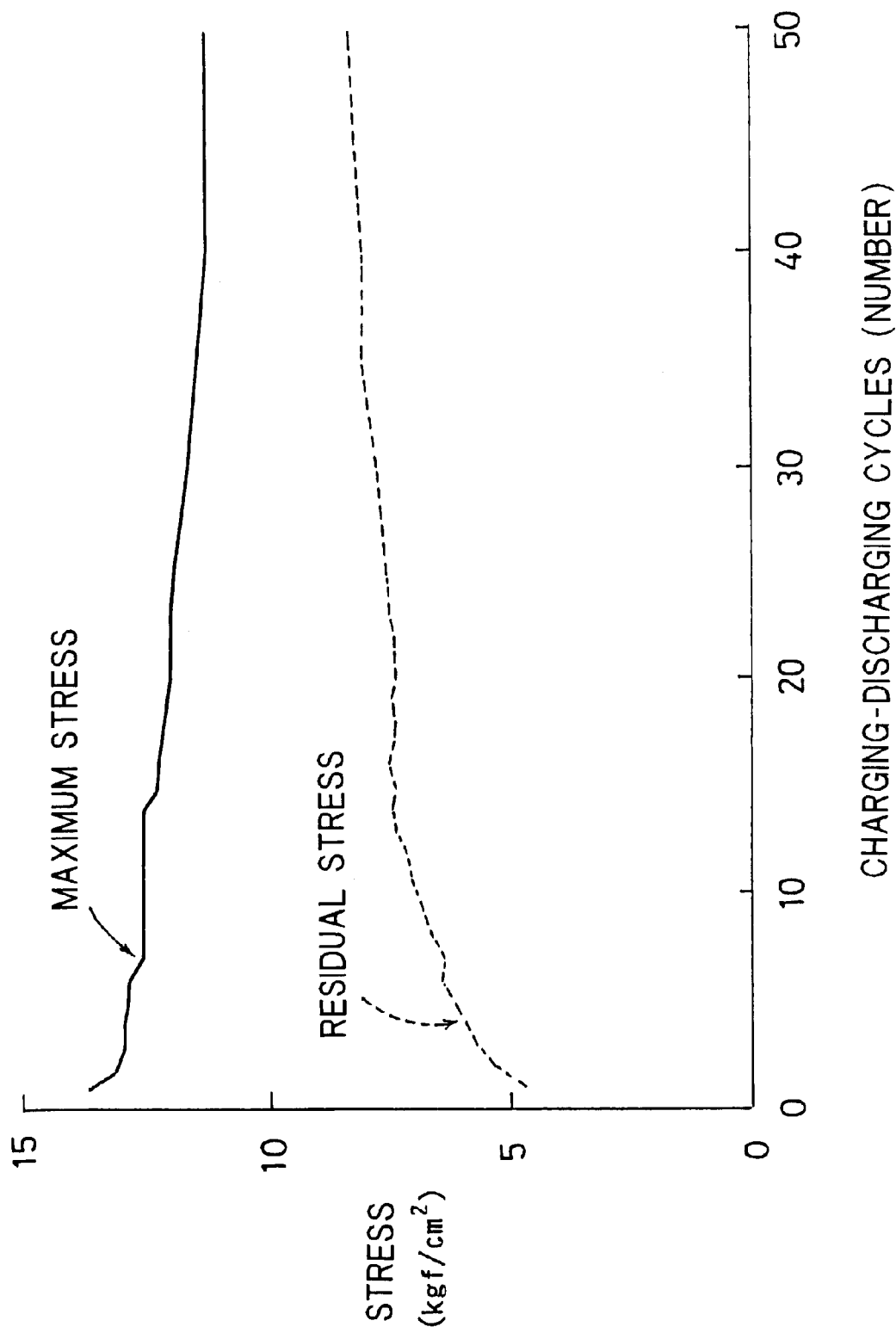
FIG. 2 is a graph showing the stresses generated or remaining in the charging-discharging cycles of the electrochemical capacitor of FIG. 1.

Next, the first electrochemical capacitor 80 was subjected to charging-discharging cycles. Specifically, constant current (10 mA) charging (up to 4 V) and constant current (5 mA) discharging were repeated. The maximum stress and the residual stress in each charging-discharging cycle are shown in FIG. 2. In FIG. 2, the solid line represents maximum stresses and the dotted line represents residual stresses.

As is appreciated from FIG. 2, the maximum stresses become the largest [13.6 kgf/cm$^2$ (1.33 MPa)] during the charging of the first cycle, decrease with the progress of charging-discharging cycles, and become almost constant [11.2 kgf/cm$^2$ (1.10 MPa)] at the 40th cycle or after.

The residual stresses increase with the progress of cycles but become almost constant [8.0 kgf/cm$^2$ (784 kPa)] at the 40th cycle or after. Thus, in the present Example, the difference between the maximum stress and the residual stress became almost constant at the 40 cycle and the value was 3.2 kgf/cm$^2$ (314 kPa).

At the beginning of charging-discharging cycles, there was generation of gas from polarizing electrodes during charging; however, during the charging of the 40 th cycle, there was no generation of gas.

Next, the charging-discharging cycles were stopped when the discharging of the 40th cycle was over, and the cell integrate was taken out of the first capacitor container 70 in an inert gas atmosphere of low dew point. Then, the cell integrate was repressed at a pressure of 2.0 kgf/cm$^2$ (196 kPa).

Next, the cell integrate was transferred into a second capacitor container to assemble a second electrochemical capacitor. Incidentally, the volume of the second capacitor container is, as in the case of the first capacitor container 70, such that it can accommodate the cell integrate which is in a state compressed at a pressure of 2.0 kgf/cm$^2$ (196 kPa).

The maximum stress of the second electrochemical capacitor during charging is equal to the difference [3.2 kgf/cm2 (314 kPa)], in the first electrochemical capacitor, between the maximum stress and the residual stress; and the second capacitor container is pressed by the cell integrate of compressed state at a pressure of 2.0 kgf/cm$^2$ (196 kPa). Therefore, the second capacitor container is designed so as to show no plastic deformation against their total, i.e. a stress of 5.2 kgf/cm$^2$ (510 kPa).

In other words, while the first capacitor container 70 is required to show no plastic deformation against a stress of 13.6 kgf/cm$^2$ (1.33 MPa), the second capacitor container is required to show no plastic deformation against a stress of 5.2 kgf/cm$^2$ (510 kPa).

Next, the second electrochemical capacitor was subjected to charging-discharging cycles under the above-mentioned conditions. As a result, there was no gas generation from the polarizing electrodes and the maximum stress was constant at 5.2 kgf/cm$^2$ (510 kPa). Further, the second capacitor container showed no plastic deformation. Furthermore, the capacity of the second electrochemical capacitor was 30 F/cc and the dielectric constant was 3.5 V, which were the same as those of the first electrochemical capacitor 80; these values were larger than the values of the conventional capacitor 8 using active carbon as the main component of the polarizing electrodes.

It is clear from the above that even when the capacitor container is changed after the maximum stress has become almost constant, there can be obtained an electrochemical capacitor having the same properties as before the change of the capacitor container.

Industrial Applicability

As described above, in the present process for producing an electrochemical capacitor, a once produced electrochemical capacitor is subjected to charging-discharging cycles until the maximum stress generated during charging becomes almost constant; then, the cell integrate (or the unit cell) is transferred into another capacitor container to constitute a new electrochemical capacitor. Therefore, an electrochemical capacitor can be obtained which shows no plastic deformation of the capacitor container. Thus, an electrochemical capacitor superior in durability and reliability can be provided.

The thus-produced electrochemical capacitor shows a capacity and dielectric strength higher than those of the conventional electrochemical capacitor using active carbon.

What is claimed is:

1. A process for producing an electrochemical capacitor comprising an organic electrolytic solution and electrode bodies immersed in the organic electrolytic solution, each comprising a polarizing electrode composed mainly of a carbon material containing a partially oxidized, graphite-like microcrystalline carbon, a separator and a collector, in which capacitor each polarizing electrode gives rise to volume expansion when charged and volume contraction when discharged, which process comprises:

placing each electrode body and the organic electrolytic solution in a cell container to form a unit cell, placing the unit cell or a cell integrate obtained by electrically connecting a plurality of such unit cells, in a first capacitor container to constitute a first electrochemical capacitor, subjecting the first electrochemical capacitor to charging-discharging cycles until the maximum value of the stress caused by the volume expansion of each polarizing electrode during charging becomes almost constant, and transferring, after the maximum value of the stress has become almost constant, the unit cell or the cell integrate into a second capacitor container to constitute a second electrochemical capacitor.

2. A process for producing an electrochemical capacitor according to claim 1, wherein the first capacitor container has a pressure-releasing valve.

* * * * *